US010267934B2

(12) United States Patent
Wang et al.

(10) Patent No.: US 10,267,934 B2
(45) Date of Patent: Apr. 23, 2019

(54) SYSTEM AND METHOD FOR GENERATING A DEPOSITIONAL SEQUENCE VOLUME FROM SEISMIC DATA

(71) Applicants: Ke Wang, Sugarland, TX (US); Kaihong Wei, Humble, TX (US); Kevin Deal, Houston, TX (US); Dave Wilkinson, Spring, TX (US)

(72) Inventors: Ke Wang, Sugarland, TX (US); Kaihong Wei, Humble, TX (US); Kevin Deal, Houston, TX (US); Dave Wilkinson, Spring, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 838 days.

(21) Appl. No.: 14/595,964

(22) Filed: Jan. 13, 2015

(65) Prior Publication Data
US 2016/0202370 A1    Jul. 14, 2016

(51) Int. Cl.
*G01V 1/28* (2006.01)
*G01V 99/00* (2009.01)

(52) U.S. Cl.
CPC ............ *G01V 1/282* (2013.01); *G01V 99/005* (2013.01); *G01V 2210/64* (2013.01);
(Continued)

(58) Field of Classification Search
None
See application file for complete search history.

(56) References Cited

U.S. PATENT DOCUMENTS 5,657,223 A * 8/1997 Juszczak ................. G01V 1/28
702/14
5,991,695 A * 11/1999 Wang ..................... G06F 17/16
702/14
(Continued)

FOREIGN PATENT DOCUMENTS

CN          101303414        5/2008
EP           2778724 A2      9/2014
(Continued)

OTHER PUBLICATIONS

PCT International Preliminary Report on Patentability, International Appl. PCT/US2016/012267, dated Jul. 27, 2017, pp. 1-8.
(Continued)

*Primary Examiner* — Michael Lebentritt
(74) *Attorney, Agent, or Firm* — Marie L. Clapp; Jesse A. Salen (57) ABSTRACT

A method of generating a depositional sequence volume from seismic data is performed at a computer system having one or more processors and memory storing programs to be executed by the one or more processors. The method includes the following steps: receiving a seismic dataset, wherein the seismic dataset includes image values at a plurality of grid points of a 3-D subsurface model; identifying reflections at a first subset of the plurality of grid points and geological constraints at a second subset of the plurality of grid points of the 3-D subsurface model from processing the image values of the seismic dataset; and generating a depositional sequence volume for the 3-D subsurface model from the reflections at the first subset of grid points and the geological constraints at the second subset of grid points.

24 Claims, 8 Drawing Sheets

(52) U.S. Cl.
CPC .. *G01V 2210/641* (2013.01); *G01V 2210/642* (2013.01); *G01V 2210/661* (2013.01)

(56) References Cited

U.S. PATENT DOCUMENTS

| | | | |
|---|---|---|---|
| 6,313,837 B1 | 11/2001 | Assa et al. | |
| 6,708,118 B2 | 3/2004 | Stark | |
| 6,850,845 B2 | 2/2005 | Stark | |
| 6,853,922 B2 | 2/2005 | Stark | |
| 6,885,946 B1* | 4/2005 | Drummond | G06F 15/8007 702/16 |
| 6,996,028 B2* | 2/2006 | Bernth | G01V 1/303 367/38 |
| 6,996,470 B2* | 2/2006 | Kamps | G01V 1/28 702/17 |
| 7,039,526 B2* | 5/2006 | Kelly | G01V 1/28 702/14 |
| 7,243,046 B1* | 7/2007 | Patlashenko | G06F 11/3419 702/183 |
| 7,584,056 B2* | 9/2009 | Koren | G01V 1/28 175/50 |
| 7,733,741 B2* | 6/2010 | Pan | G01V 1/28 367/51 |
| 8,213,261 B2 | 7/2012 | Imhof et al. | |
| 8,380,435 B2* | 2/2013 | Kumaran | G01V 1/301 166/250.1 |
| 8,660,798 B2* | 2/2014 | Wang | G01V 1/364 367/43 |
| 8,743,115 B1* | 6/2014 | Mallet | G01V 1/302 345/419 |
| 9,002,651 B2* | 4/2015 | Liu | G01V 99/00 702/16 |
| 9,182,913 B2* | 11/2015 | Flanagan | G06F 3/0611 |
| 9,261,615 B2* | 2/2016 | Kumaran | G01V 1/30 |
| 9,523,782 B2* | 12/2016 | Imhof | G01V 1/345 |
| 9,529,115 B2* | 12/2016 | Dimitrov | G01V 1/301 |
| 9,542,507 B2* | 1/2017 | Bo | G06F 17/5009 |
| 9,728,003 B1* | 8/2017 | Mallet | G01V 1/302 |
| 9,746,567 B2* | 8/2017 | Grimm | G01V 1/28 |
| 2005/0114032 A1* | 5/2005 | Wang | G01V 1/28 702/14 |
| 2005/0143921 A1* | 6/2005 | Winbow | G01V 1/301 702/14 |
| 2005/0171700 A1* | 8/2005 | Dean | G01V 1/301 702/16 |
| 2008/0109168 A1* | 5/2008 | Koren | G01V 1/32 702/16 |
| 2008/0260258 A1* | 10/2008 | Wang | G06T 5/20 382/199 |
| 2010/0061184 A1* | 3/2010 | Winbow | G01V 1/28 367/73 |
| 2011/0115787 A1 | 5/2011 | Kadlec et al. | |
| 2012/0203523 A1* | 8/2012 | Tan | G01V 1/28 703/2 |
| 2012/0209526 A1 | 8/2012 | Imhof et al. | |
| 2013/0246031 A1 | 9/2013 | Wu et al. | |
| 2013/0338987 A1 | 9/2013 | Cheng et al. | |
| 2013/0262052 A1 | 10/2013 | Mallet et al. | |
| 2014/0214327 A1 | 7/2014 | Stavanger et al. | |
| 2014/0214328 A1 | 7/2014 | Sola et al. | |
| 2014/0257780 A1* | 9/2014 | Jing | G01V 99/005 703/6 |

FOREIGN PATENT DOCUMENTS

| | | |
|---|---|---|
| WO | WO2012078217 | 8/2011 |
| WO | WO2012102784 | 12/2011 |
| WO | WO2014001751 | 4/2013 |

OTHER PUBLICATIONS

PCT International Search Report and Written Opinion, International Application PCT/US2016/012267, dated Apr. 11, 2016.

Sebastien Guillon et al., Geotime: A 3D automatic tool for chronostratigraphic seismic interpretation and filtering, Feb. 2013, Society of Exploration Geophysicists 1938-3789 (online).

G. Zinck et al., Local dip transformation for fast seismic horizon reconstruction, Sep. 15, 2013, 2013 IEEE International Conference on Image Processing.

G. Zinck et al., Discontinuous Seismic Horizon Tracking Based on a Poisson Equation With Incremental Dirichlet Boundary Conditions, 2011, 18th IEEE International Conference on Image Processing.

* cited by examiner

SYSTEM AND METHOD FOR GENERATING A DEPOSITIONAL SEQUENCE VOLUME FROM SEISMIC DATA

TECHNICAL FIELD

The disclosed embodiments relate generally to techniques for seismic data processing and interpretation, in particular to, system and method for generating a depositional sequence volume from seismic data.

BACKGROUND

A subsurface region typically includes multiple geological horizons stacked together, each horizon corresponding to subsurface materials deposited during a predefined geological time period (e.g., from a few thousand years to millions of years). Seismic exploration is an important tool of generating seismic images of the geological horizons and understanding the geological structures of the subsurface region. Based at least partly on the seismic images, geoscientists construct different models of the geological structures to survey the subsurface region for hydrocarbon reservoirs. But due to various geological movements, an originally continuous geological horizon is often not continuous but broken into pieces separated by geological constraints like faults, unconformities, truncation surfaces, etc. These geological constraints, if not dealt with appropriately, would significantly undermine the quality of the modeling results from the seismic images and may even lead to mis-interpretations of hydrocarbon reservoir locations in a subsurface region.

SUMMARY

Accordingly, there is a need for methods of dealing with the challenges presented by geological constraints within a subsurface region, so that geological horizons within the subsurface region are accurately extracted from the seismic data regardless of the region's geological complexity.

In accordance with some embodiments, a method is performed at a computer system with one or more processors and memory for generating a depositional sequence volume from seismic data. The method includes receiving a seismic dataset, wherein the seismic dataset includes image values at a plurality of grid points of a 3-D subsurface model; identifying reflections at a first subset of the plurality of grid points and geological constraints at a second subset of the plurality of grid points of the 3-D subsurface model from processing the image values of the seismic dataset; and generating a depositional sequence volume for the 3-D subsurface model from the reflections at the first subset of grid points and the geological constraints at the second subset of grid points.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a method of generating a depositional sequence volume from seismic data. In doing so, the methods, systems, and computer readable storage medium can be used to improve the accuracy of interpreting the geological structures in a 2-D/3-D subsurface region.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Figure 1:
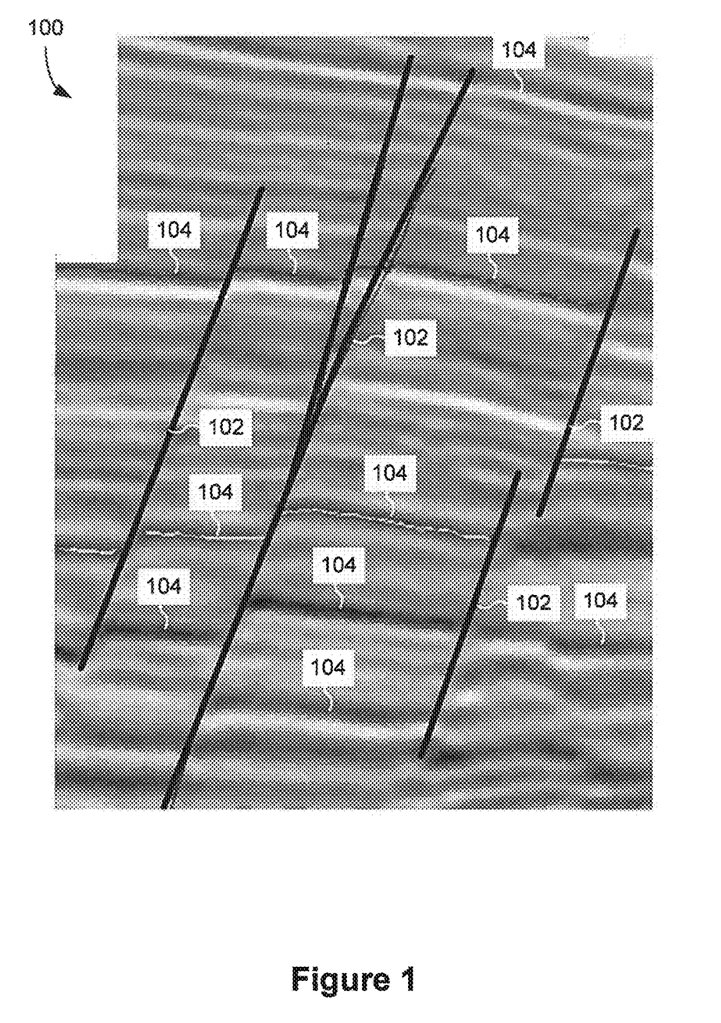
FIG. 1 is a 2-D seismic image including reflections separated by multiple fault planes.

FIG. 1 is a 2-D seismic image 100. The seismic image 100 includes multiple seismic reflections. In this example, some of the seismic reflections 104 are separated by the fault planes 102 into multiple discontinuous pieces, causing relative movements between geological structures at two opposite sides of a fault plane. Although the seismic image 100 itself is useful for interpreting the geological structures of a subsurface region from which the seismic image 100 is generated, it may not be as intuitive as it should be especially when the subsurface region has very complex 3-D geological structures such as salt domes. For example, although it is possible to show the geological structure of a salt dome within a seismic image cube slice by slice, it is difficult to generate a 3-D visualization of the top of the salt dome directly from the seismic image cube since the seismic image cube is a collection of individual image values at regular 3-D grid points. Therefore, geoscientists often need to generate additional models of the subsurface region from a seismic dataset. These models are used by the geoscientists to better understand the geological structures within the subsurface region.

According to the present application, depositional sequence volume (DSV) is a geological model that can be derived from a seismic dataset for better visualizing complex 3-D geological structures of a subsurface region. Technically, a depositional sequence volume is a collection of depositional sequence values at regular grid points of the subsurface region. The specific values at different grid points represent a chronological formation order of geological horizons within the subsurface region although their magnitudes may only have relative meanings and do not necessarily represent the actual amount of time it takes for the geological horizons to be formed.

Figure 2A:
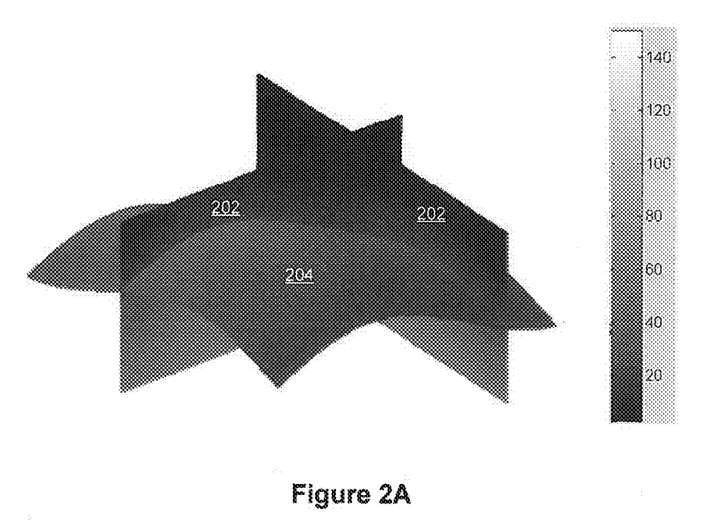
FIG. 2A illustrates two slices of a synthetic depositional sequence volume extracted from a synthetic seismic image cube and an isosurface of the depositional sequence volume in accordance with some embodiments.
Figure 2B:
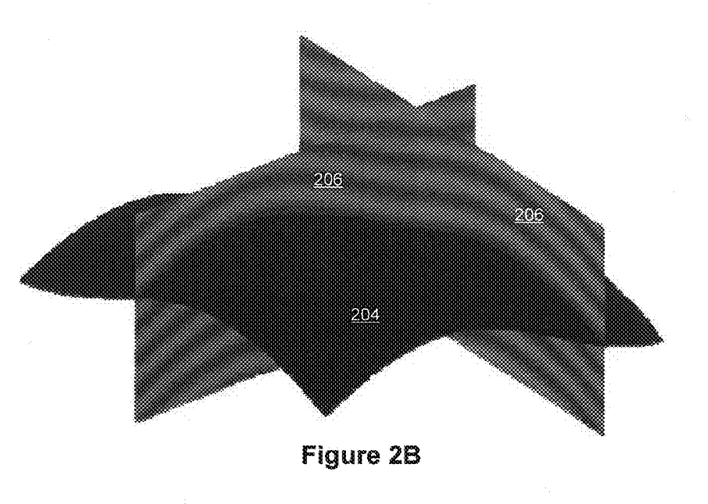
FIG. 2B illustrate two slices of the synthetic seismic image cube and the isosurface of the synthetic depositional sequence volume in accordance with some embodiments.

FIG. 2A illustrates two slices 202 of a synthetic depositional sequence volume extracted from a synthetic seismic image cube and an isosurface 204 of the synthetic depositional sequence volume in accordance with some embodiments. As noted above, the scale of 0-150 of the deposition sequence values represents the chronological formation order of geological horizons within the subsurface region. The two slices 202 of the depositional sequence volume indicate that the top surface of the subsurface region has a depositional sequence value of 0 and the depositional sequence value increases along the depth axis in two perpendicular directions such that, the deeper the grid point, the higher the depositional sequence value. The isosurface 204 is generated by filtering the depositional sequence volume with a particular depositional sequence value or a range thereof. From this isosurface 204, geoscientists can learn the structure of a particular geological horizon within the subsurface region. FIG. 2B illustrate two slices 206 of the synthetic seismic image cube and the isosurface 204 of the synthetic depositional sequence volume in accordance with some embodiments. Note that the shape of the isosurface 204 closely matches the distribution of a seismic reflection within the synthetic seismic image cube, which is another indication of the accuracy of the isosurface 204.

Figure 2C:
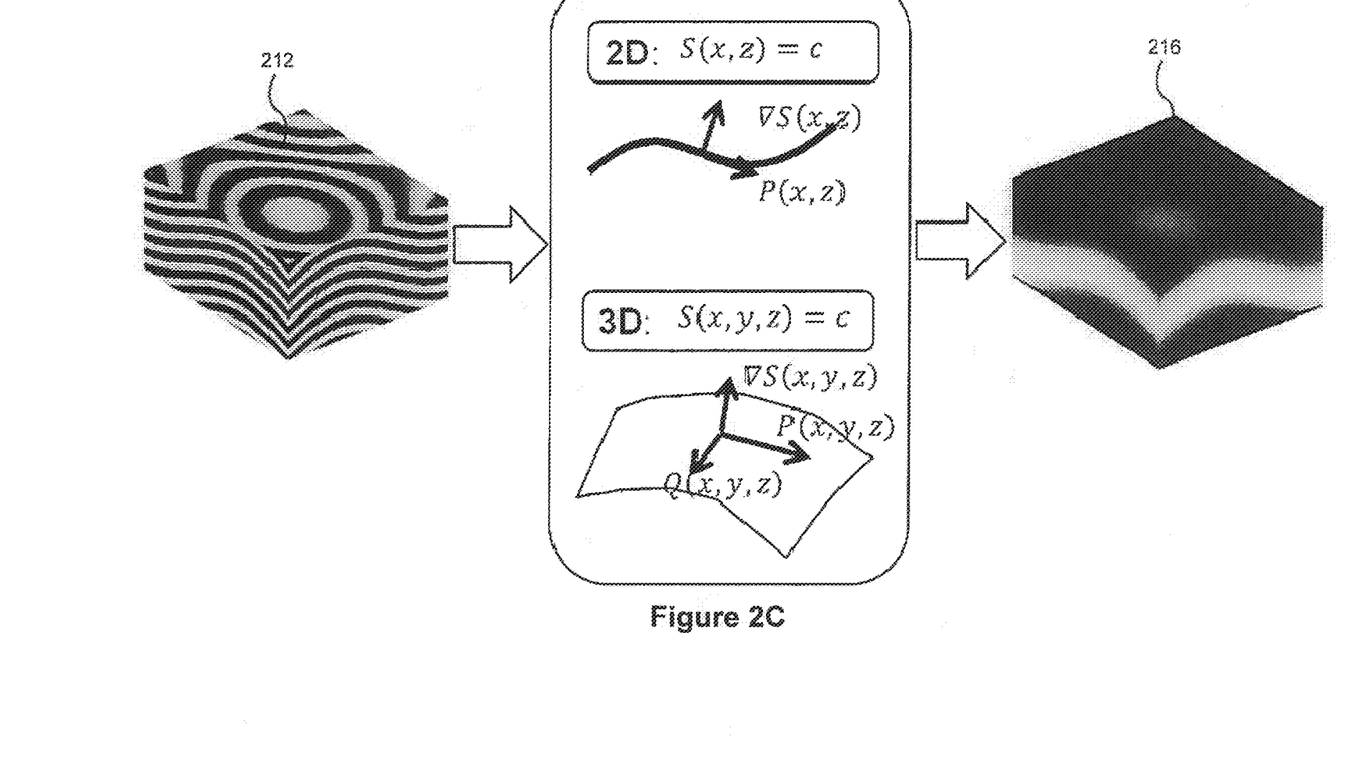
FIG. 2C is a schematic process flow of generating a depositional sequence volume from a seismic dataset in accordance with some embodiments.

FIG. 2C is a schematic process flow of generating a depositional sequence volume from a seismic dataset in accordance with some embodiments. As shown in the figure, the process starts with a seismic dataset 212 associated with a subsurface region (e.g., a seismic image cube of the surface region). The seismic dataset 212 is typically a collection of image values at regular grid points of the subsurface region. These image values provide information about the location and orientation of geological horizons within the subsurface region. The underlying assumption is that the direction of sediment accumulation, or equivalently, the gradient of depositional sequence function, should be orthogonal to the pre-existing reflector planes in the seismic dataset 212. As shown in the box 214 of FIG. 2C, this assumption requires that the depositional sequence volume 216, which is defined as $S(x, z)$ in 2-D domain and $S(x, y, z)$ in 3-D domain, respectively, be subject to the following mathematical relationships:

2-D domain:

$$\nabla S(x,z) \cdot \vec{P}(x,z) = 0,$$

where $\vec{P}(x, z)$ is a tangent vector of a geological horizon at a particular location within the subsurface region; and 3-D domain:

$$\nabla S(x,y,z) \cdot \vec{P}(x,y,z) = 0,$$
$$\nabla S(x,y,z) \cdot \vec{Q}(x,y,z) = 0,$$

where $\vec{P}(x, y, z)$ and $\vec{Q}(x, y, z)$ are a pair of tangent vectors of a geological horizon at a particular location within the subsurface region.

Mathematically, the orthogonal relationships above are enforced by the following optimization problems, where $\|\cdot\|_2$ represents the $L_2$ norm of a function:

2-D domain:

$$\min_S \|\nabla S(x, z) \cdot \vec{P}(x, z)\|_2^2$$

3-D domain:

$$\min_S \|\nabla S(x, y, z) \cdot \vec{P}(x, y, z)\|_2^2 + \|\nabla S(x, y, z) \cdot \vec{Q}(x, y, z)\|_2^2$$

By integrating by parts, the optimization problem above is converted into the following set of partial differential equations:

2-D domain:

$$\nabla \cdot (\sigma(x,z) \nabla S(x,z)) = 0, \text{ in } \Omega$$

3-D domain:

$$\nabla \cdot (\sigma(x,y,z) \nabla S(x,y,z)) = 0, \text{ in } \Omega$$

where $\Omega$ represents the image domain. In 3-D domain, $\sigma = \vec{P}\vec{P}^t + \vec{Q}\vec{Q}^t$ is a 3×3 symmetric semi-definite tensor defined at each grid point. In 2-D domain, $\sigma = \vec{P}\vec{P}^t$ is a 2×2 symmetric semi-definite tensor defined at each grid point. This set of partial differential equations is mathematically equivalent to the optimization problem above under certain boundary conditions.

The depositional sequence volume 216 is determined by solving the corresponding set of partial differential equations. There are many numerical approaches to solving the aforementioned partial differential equations, e.g., the finite-difference method or the finite-element method, each involving two important steps: (a) discretization of the subsurface region into many small cells defined by grid points and (b) application of certain boundary conditions to the subsurface region defined by the grid points.

Figure 3:
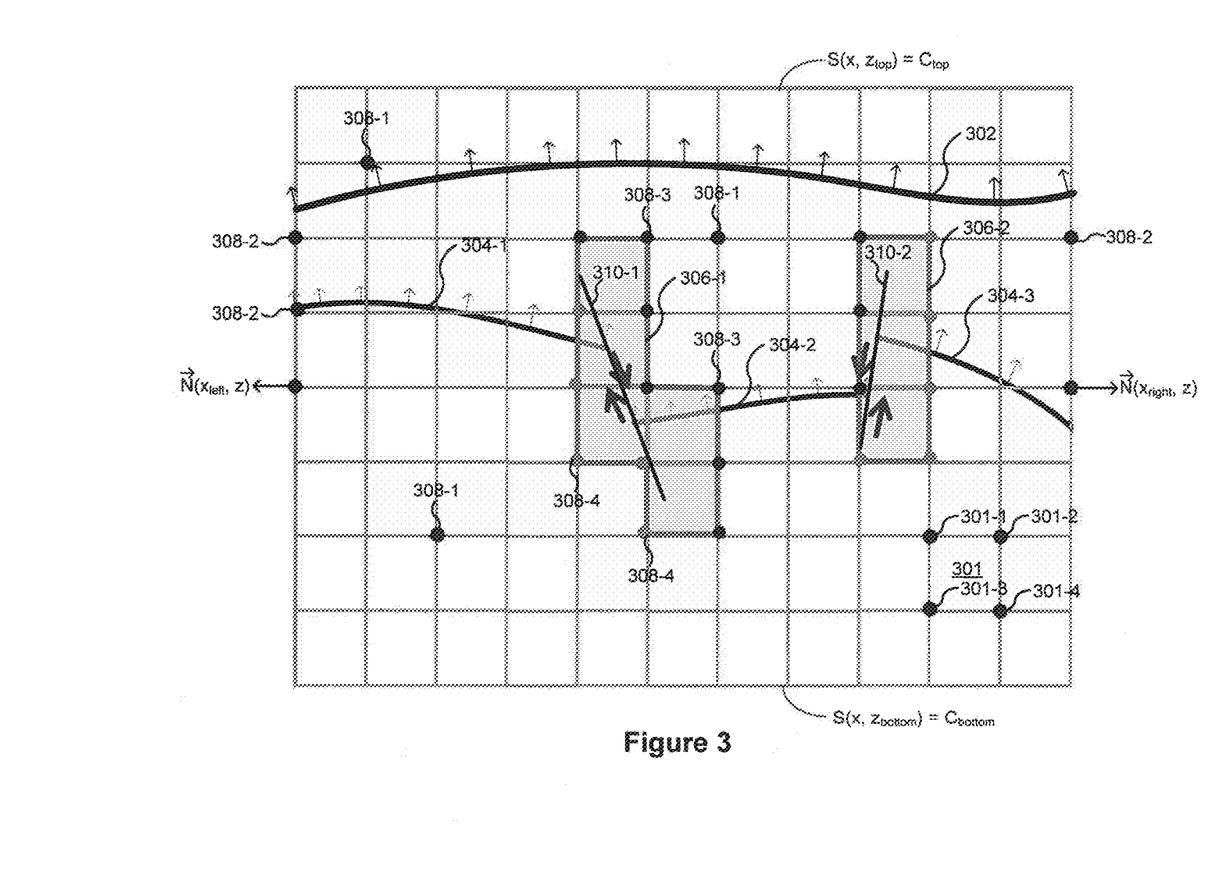
FIG. 3 is a schematic block diagram of applying boundary conditions to different grid points of a 2-D subsurface model in accordance with some embodiments.

FIG. 3 is a schematic block diagram of applying boundary conditions to different grid points of a 2-D subsurface model in accordance with some embodiments. In this case the 2-D subsurface model is divided into a mesh of rectangle cells, each cell having four grid points at its four corners. For example, the cell 301 is surrounded by four grid points 301-1 to 301-4, respectively. It will be apparent to those skilled in the art that the same methodology described below can be applied to a 3-D subsurface model defined by a mesh of cubical cells. As shown in the figure, the subsurface region includes two geological horizons 302 and 304. The geological horizon 302 is a continuous one spreading across multiple cells from left to right. Multiple arrow lines are distributed along the horizon 302 indicating the normal vectors of the geological horizon 302 at different locations, which can be derived from a seismic image dataset of the same subsurface region. Needless to say, a normal vector can uniquely define a tangent vector at the same location because the two vectors are orthogonal to each other. Unlike the geological horizon 302, the geological horizon 304 is broken into three pieces 304-1, 304-2, and 304-3 by two fault planes 310-1 and 310-2, respectively. As noted below, the discontinuities along the geological horizon 304 caused by the fault planes require that special treatments be applied to the grid points surrounding each fault plane (e.g., the grid points 308-3) when solving the partial differential equations for the depositional sequence value at each grid point using a numerical method.

Mathematically, a numerical solution of the depositional sequence volume requires that a depositional sequence value at each grid point of the subsurface model be determined according to the partial different equations described above after certain boundary conditions are met. In some embodiments, the grid points shown in the figure are first divided into multiple categories in order to apply appropriate boundary conditions to grid points at different locations of the subsurface model. In this example, the grid points are divided into three categories:

Continuous horizon grid point;
Unconformity grid point; and
Faulting grid point.

The continuous horizon grid points are located inside the subsurface model (e.g., grid points 308-1) and there is usually no boundary condition applied to the continuous horizon grid points. A depositional sequence value is determined for such grid points when solving the partial differential equations described above. Note that although two exemplary geological horizons are depicted in FIG. 3, it should be noted that these geological horizons are for illustrative purpose. There are other geological horizons existing in the subsurface region and their location and orientation will be determined by the solution to the partial differential equations.

The unconformity grid points are located at a place where a geological horizon terminates or when the continuity of a geological horizon is interrupted by a small fault with no significant fault throw. In this example, the geological horizons terminate at the left and right boundaries of the subsurface model. Therefore, the grid points at the left and right boundaries (e.g., grid points 308-2) are unconformity grid points. As will be described below, the Neumann boundary condition is applied to the unconformity grid points when solving the partial differential equations.

The faulting grid points are located at or near a fault plane whose fault throw exceeds a predefined threshold. For example, the grid points 308-3 and 308-4 shown in FIG. 3 are faulting grid points located next to the fault plane 310-1. The two sides of a non-vertical fault plane are known as "hanging wall" and "footwall," respectively. The hanging wall occurs above the fault plane and the footwall occurs below the fault plane. Therefore, the faulting grid points near a fault plane are further classified into "hanging wall faulting grid points" (e.g., grid point 308-3) and "footwall grid points" (e.g., grid point 308-4).

In sum, a collection of the continuous horizon grid points 308-1, the unconformity grid points 308-2, and the faulting grid points 308-3 and 308-4 is the grid mesh at which the partial differential equation is to be solved using a numerical method like finite-difference or finite-element methods. To make this problem solvable, the following boundary conditions are applied to different subset of grid points:

Dirichlet boundary conditions are applied to the grid points where the depositional sequence values are predetermined. One example is the regular geological setting where the depositional order increases monotonically from shallow to deep. In this case, a Dirichlet boundary condition is set at the top and bottom of the image domain as follows:

$$S(x,y,z_{top})=c_{min}, S(x,y,z_{bottom})=c_{max}.$$

Note that $c_{min}<c_{max}$ is required such that the sequence order at the bottom is older/larger than that at the top. For example, $c_{min}$ is set to zero and $c_{max}$ is set to an arbitrary positive number T (e.g., 100). The above boundary condition implies that the top and bottom slices of the depositional sequence volume be two "horizons" which can only be legitimate if the normal vectors of the depositional sequence value point vertically at $z=z_{top}$ and $z=z_{bottom}$. In some embodiments, the original image volume in the vertical direction is extended by adding small padding zones at top and bottom to gradually taper the x and y components of the normal vectors to zero, and impose the above Dirichlet boundary condition on the extended image cube. Other examples of Dirichlet boundary conditions include interpreted horizons and well markers with known depositional sequence orders so that they can be readily represented as Dirichlet boundary condition at corresponding grid points.

Neumann boundary conditions are applied to the grid points corresponding to the discontinuous cell boundaries where depositional sequence values cannot be predetermined. For example, because the horizon sequence order on the four side walls of the image domain is usually unknown, the Neumann boundary conditions are applied to the four side walls as follows:

$$\nabla S(x,y,z) \cdot \vec{m} = \theta, \vec{m} \text{ being normal vector of the cell boundaries,}$$

wherein θ is set to zero or other predefined parameters. As shown in FIG. 3, $\vec{m}$ is illustrated by $\vec{N}(x_{left}, z)$ or $\vec{N}(x_{right}, z)$. Interpreted faults and unconformity surfaces are treated as interior boundaries of the image domain. In particular, the above Neumann boundary conditions are set at the boundaries of the cells that are cut by the interpreted unconformities. The solution is set to be discontinuous across those cells. In some embodiments, the same boundary conditions can also be used at the cells cut by the fault planes.

If the fault throw needs to be considered, the "jump condition" is applied to the fault planes. "Jump condition" implies that the differences in depositional sequence value satisfying a predefined depositional sequence order jump condition be assigned to the hanging wall and footwall faulting grid points at two sides of a fault plane as follows:

$$\delta S_M = \text{Interp}_{M,N}(S_N^h) - \text{Interp}_{M,N}(S_N^f)$$

$\delta S_M$ is a M by 1 matrix with each element representing a specific difference given to a particular location on the fault plane $\text{Interp}_{M,N}$ is a m by n matrix defining an interpolation operator between the faulting grid points and the locations on the fault plane (M≥N)

$S_N^h$ is a N by 1 matrix with each element representing the depositional sequence value at a particular hanging wall faulting grid point; and $S_N^f$ is an N by 1 matrix with each element representing the depositional sequence value at a particular footwall faulting grid point.

After applying appropriate boundary conditions to certain grid points of the subsurface model as described above, the depositional sequence value at each continuous horizon grid point can be determined by solving the partial differential equations:

2-D domain:

$$\nabla \cdot (\sigma(x,z)\nabla S(x,z))=0, \text{ and}$$

3-D domain:

$$\nabla \cdot (\sigma(x,y,z)\nabla S(x,y,z))=0.$$

Figure 4:
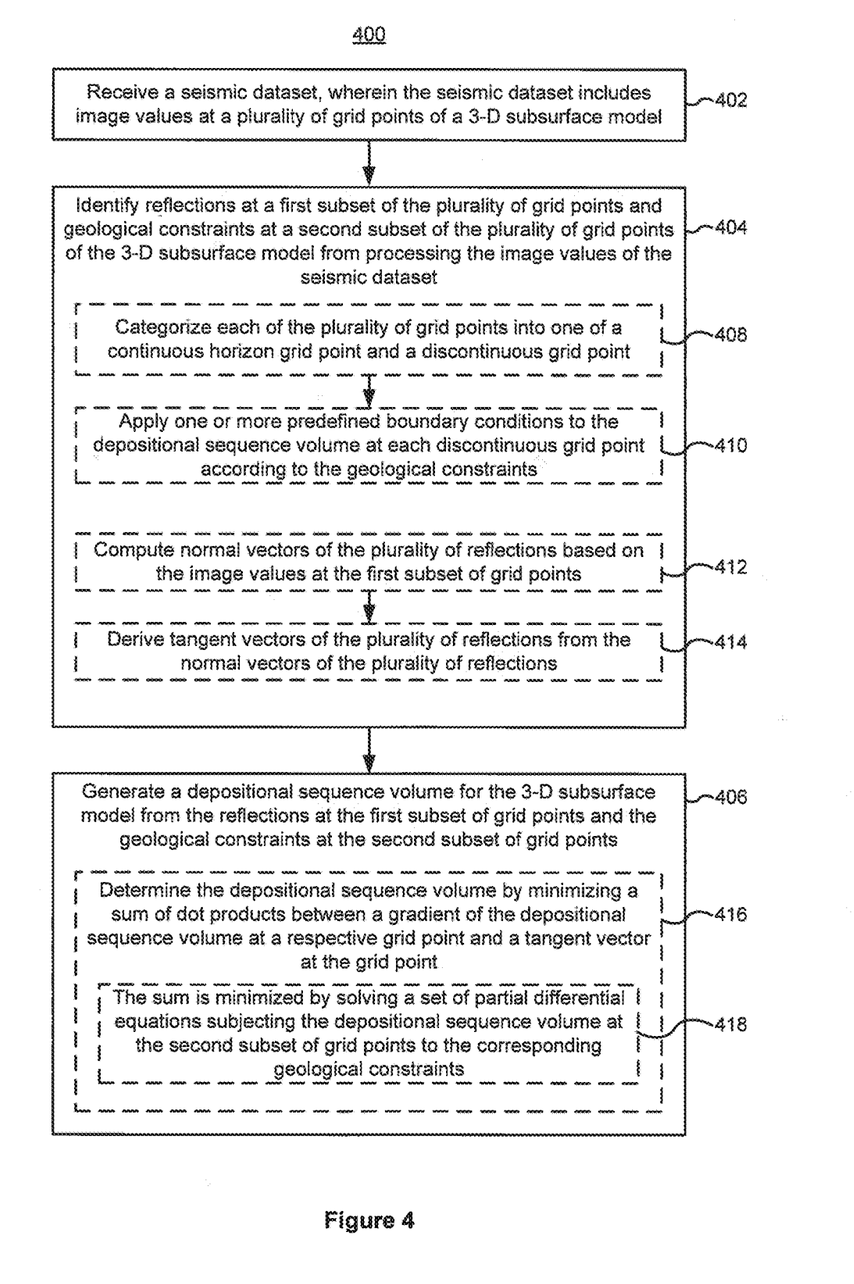
FIG. 4 is a schematic flow chart of a method for generating a depositional sequence volume from a seismic cube by solving a set of partial differential equations in accordance with some embodiments.
Figure 6A:
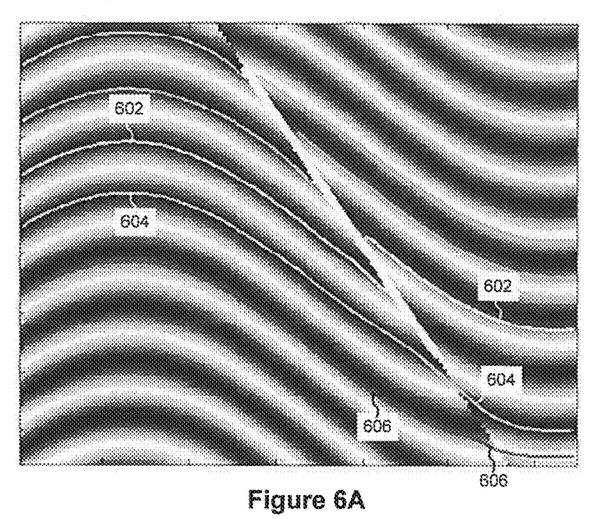
FIGS. 6A-6C are schematic views of multiple geological horizons and fault planes overlaid on a seismic dataset, a depositional sequence volume derived from the seismic dataset by imposing boundary conditions at the fault plane locations, and the depositional sequence value gaps along the fault plane locations in accordance with some embodiments.

FIG. 4 is a schematic flow chart of a method performed by a computer system for generating a depositional sequence volume for a subsurface model from a seismic cube by solving a minimization problem in accordance with some embodiments. The method starts with receiving (402) a seismic dataset. As noted above, the seismic dataset is typically a seismic image dataset including image values at a plurality of grid points of a 2-D/3-D subsurface model. For example, the seismic image dataset may be the result of applying seismic imaging methods to a plurality of seismic traces collected from a region corresponding to the subsurface model. FIG. 6A depicts a 2-D synthetic seismic image that includes geological horizons, some of which being separated apart by a fault plane in the subsurface region.

Next, the method identifies (404) reflections at a first subset of the plurality of grid points and geological constraints at a second subset of the plurality of grid points of the 3-D subsurface model from processing the image values of the seismic dataset. The identification of reflections typically includes the step of computing (412) normal vectors of the plurality of reflections identified before based on the image values at the first subset of grid points. After computing the normal vectors, the method derives (414) tangent vectors of the plurality of reflections from the normal vectors of the plurality of reflections. For example, given a normal vector at a particular continuous horizon grid point, the method calculates a pair of tangent vectors at the same grid point using the normal vector, each tangent vector being orthogonal to the normal vector and the pair of tangent vectors being linearly independent from each other. In some embodiments, the pair of tangent vectors are also orthogonal to each other. In other words, the three vectors define a Cartesian coordinate system at a particular continuous horizon grid point. Referring again to FIG. 6A, the seismic image includes multiple reflections stretching from the left side to the right side of the seismic image. In some embodiments, the geological constraints (e.g., fault planes, unconformities or truncation planes) are identified within the seismic image manually or using a seismic interpretation software application. In FIG. 6A, the fault plane cuts through the geological horizons into multiple segments. In order to solve the partial differential equation, certain boundary conditions need to be applied to the faulting grid points surrounding the fault planes.

Figure 6B:
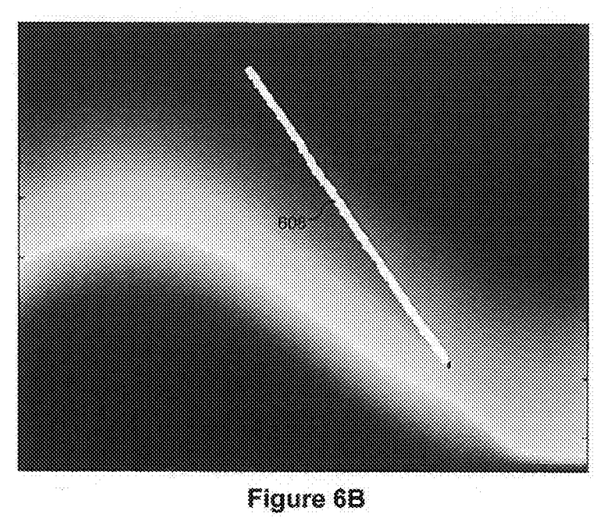
Figure 6C:
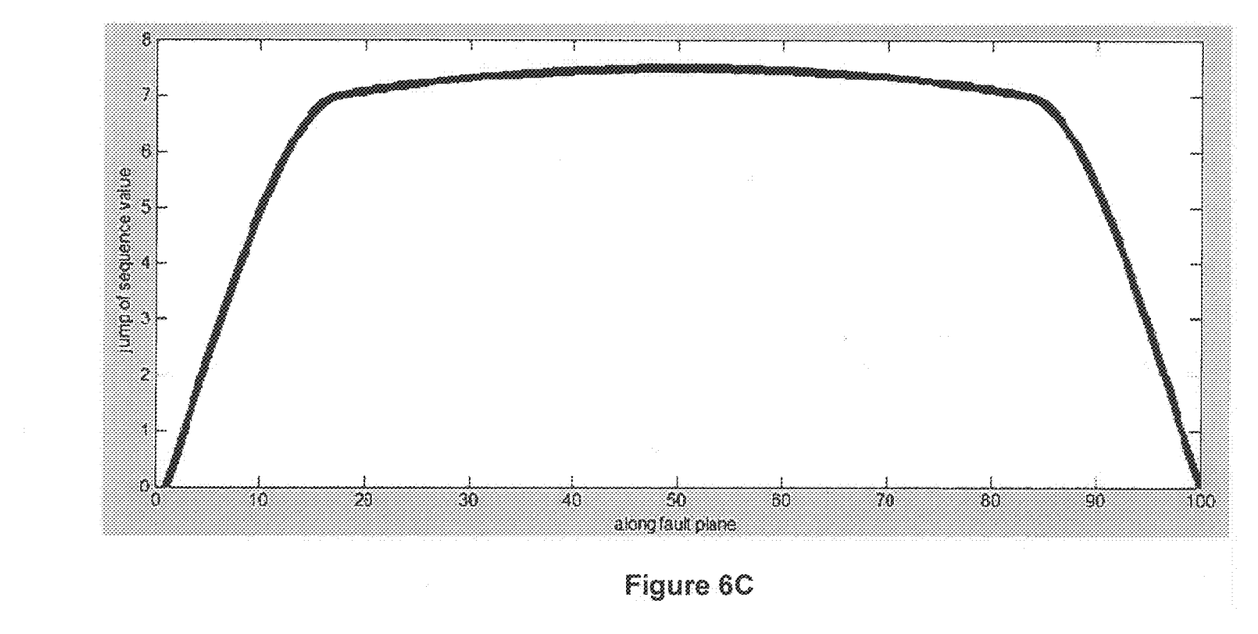

Finally, the method generates (406) a depositional sequence volume for the 2-D/3-D subsurface model from the reflections at the first subset of grid points and the geological constraints at the second subset of grid points. FIG. 6B depicts a depositional sequence volume (a 2-D section in this example) derived from the seismic image shown in FIG. 6A. Note that the fault plane in FIG. 6A corresponds to the grid points 608 in the depositional sequence volume. The jump condition shown in FIG. 6C is applied to solve the depositional volume shown in FIG. 6B. When applying different values to the depositional sequence volume shown in FIG. 6B, a corresponding contour line (or isoline) is identified in the depositional sequence volume. As shown in FIG. 6A, the contour lines 602, 604, 606 corresponding to different depositional sequence values are overlaid on the seismic image. In general, the contour lines closely match the geological horizons in the seismic image. Note that the contour line 602 is divided into two segments by the fault plane and there is a significant slip of the same geological horizon at two opposite sides of the fault plane. In other words, the contour lines accurately represent the structure and orientation of the geological horizons within the subsurface region by taking into account of the geological constraints like the fault plane. Although a single fault plane is illustrated in FIG. 6A, the same approach is applicable to a case involving multiple fault planes.

As noted above, the generation of the depositional sequence volume can be defined as the problem of solving a partial differential equation for the subsurface model subject to certain boundary conditions. In some embodiments, the method determines (416) the depositional sequence volume by minimizing a sum of dot products between a gradient of the depositional sequence volume at a respective grid point and a pair of tangent vectors at the same grid point using numerical tools like finite-difference or finite-element method. Mathematically, the partial differential equation is equivalent to the minimization problem. In order to make sure that the partial differential equation is solvable, the sum is minimized (418) by solving a set of partial differential equations that subjects the depositional sequence volume at the second subset of grid points to the corresponding geological constraints, which may represent different boundary conditions that the partial differential equation has to comply with.

As noted above, the application of boundary conditions to different locations of a subsurface model includes categorizing (408) each of the plurality of grid points into one of a continuous horizon grid point and a discontinuous grid point (e.g., a faulting grid point or an unconformity grid point) and then applying (410) one or more predefined boundary conditions to the depositional sequence volume at each discontinuous grid point according to the geological constraints.

For example, one predefined boundary condition is the so-called "Dirichlet boundary condition" under which constant or variable predefined values may be prescribed to the top and bottom slides of the 3-D subsurface model, and/or a collection of grid points with predetermined depositional sequence orders, and/or well markers.

Another predefined boundary condition is the so-called "Neumann boundary condition," i.e., the depositional sequence volume satisfies Neumann boundary conditions at each discontinuous grid point (including the unconformity boundaries or fault planes) of the 3-D subsurface model. When a geological horizon is separated by a fault plane and the corresponding fault throw between the two opposite sides of the fault plane needs to be considered, a jump boundary condition defined by the fault throw may be imposed such that the gap of depositional sequence volume at the faulting grid points at two opposite sides of a fault plane has a predefined value.

FIG. 6C depict a curve corresponding to the fault plane shown in FIGS. 6A and 6B. In particular, the horizontal axis represents the length of a fault plane measured from its end near the top surface and the vertical axis represents the difference in depositional sequence value between the hanging wall faulting grid point and the footwall faulting grid point, or $$\delta S_M = \text{Interp}_{M,N}(S_N^h) - \text{Interp}_{M,N}(S_N^f)$$

Figure 5:
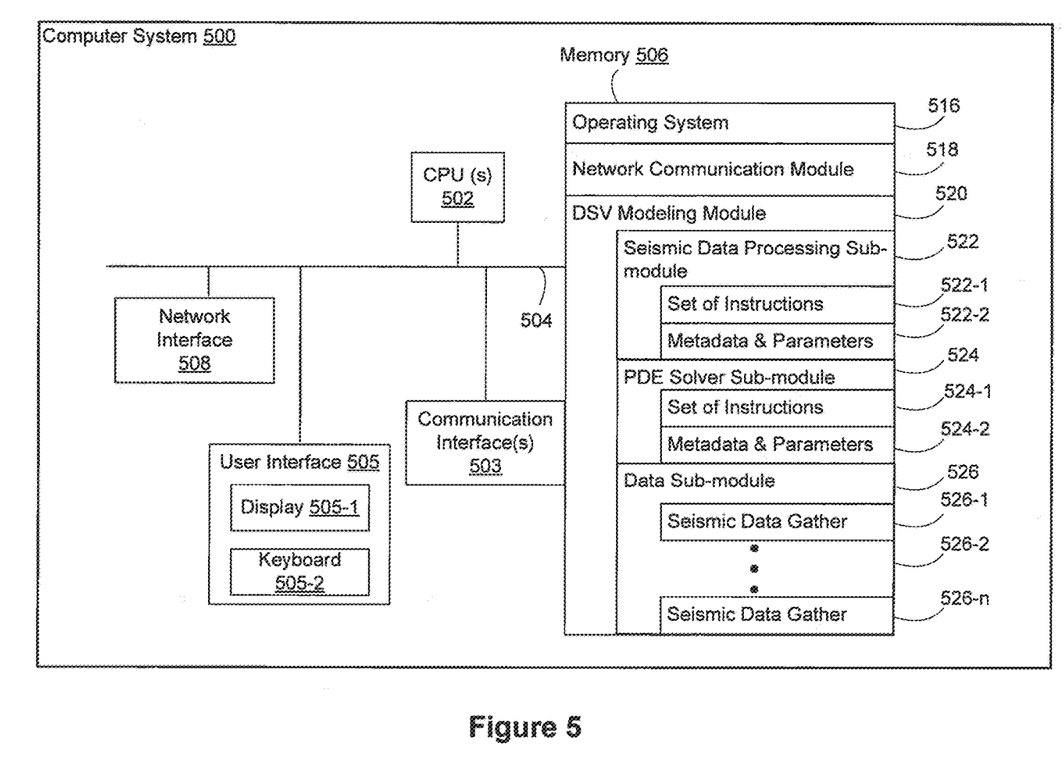
FIG. 5 is a schematic block diagram illustrating a computer system for implementing the method described in connection with FIG. 4 in accordance with some embodiments.

Note that $\delta S_M$ is zero at the two end points of the fault plane and increases/decreases gradually along the direction of the fault plane FIG. 5 is a schematic block diagram illustrating a computer system for implementing the method described above in connection with FIG. 4 in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

In some embodiments, the computer system 500 includes one or more processing units (CPU's) 502, one or more network interfaces 508 or other communications interfaces 503, memory 506, and one or more communication buses 504 for interconnecting these and various other components. The computer system 500 also includes a user interface 505 (e.g., a display 505-1 and a keyboard 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium.

In some embodiments, memory 506 or the non-transitory computer readable storage medium of memory 506 stores the following programs, modules and data structures, or a subset thereof including an operating system 516, a network communication module 518, and a depositional sequence volume (DSV) modeling module 520.

The operating system 516 includes procedures for handling various basic system services and for performing hardware dependent tasks. The network communication module 518 facilitates communication with other devices (e.g., a remote computer server) via the communication network interfaces 508 (wired or wireless) and one or more communication networks, such as the Internet, other wide area networks, local area networks, metropolitan area networks, and so on.

In some embodiments, the DSV modeling module 520 is configured to receive (e.g., and store in data sub-module 526), one or more seismic datasets (e.g., seismic data gather 526-1 through 526-n as shown in FIG. 6A). Each seismic dataset includes image values at a plurality of grid points corresponding to a 2-D/3-D subsurface model. A seismic data processing sub-module 522 is configured to identify reflections at a first subset of the plurality of grid points and geological constraints at a second subset of the plurality of grid points of the 3-D subsurface model from processing the image values of the seismic dataset. Typical geological constraints include faults, unconformities, truncation surfaces, etc. As described above, the identified reflections and geological constraints are used for determining the depositional sequence volume based on the seismic dataset. A PDE solver sub-module 524 is configured to generate a depositional sequence volume for the 2-D/3-D subsurface model from the reflections at the first subset of grid points and the geological constraints at the second subset of grid points. In particular, the PDE solver sub-module 524 categorizes the plurality of grid points into one of a continuous horizon grid point, a faulting grid point, and an unconformity grid point and then applies one or more predefined boundary conditions to the depositional sequence volume at each faulting or unconformity grid point according to the geological constraints. In some embodiments, the PDE solver sub-module 524 is configured to convert the minimization problem into solving a set of partial differential equations by computing normal vectors of the plurality of reflections identified before based on the image values at the first subset of grid points, deriving tangent vectors of the plurality of reflections from the normal vectors of the plurality of reflections, and determining the depositional sequence volume by minimizing a sum of squares of a dot product between a gradient of the depositional sequence volume (which is to be solved by the partial differential equations) at a respective grid point and a respective tangent vector at the same grid point using numerical tools like finite-difference or finite-element method.

To achieve those ends, the seismic data processing sub-module 522 includes a set of instructions 522-1 and metadata and parameters 522-2; and the PDE solver sub-module 524 includes a set of instructions 524-1 and metadata and parameters 524-2; and.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of generating a depositional sequence volume from seismic data, the method comprising:
   at a computer system having one or more processors and memory storing programs to be executed by the one or more processors:
   obtaining, from a data sub-module, a seismic dataset comprising grid points of a 3-D subsurface model, wherein a first subset of grid points and a second subset of grid points identify corresponding 3-D seismic image cubes located within a 3-D cubical mesh and the first subset of grid points and the second subset of grid points comprise image values that describe the location and orientation of geological horizons located within the corresponding 3-D seismic image cubes;
   identifying, with a depositional sequence volume (DSV) modeling sub-module, reflections at the first subset of the grid points and geological constraints at the second subset of the grid points by processing the image values;
   generating, with a PDE solver, a depositional sequence volume for the 3-D subsurface model from the reflections at the first subset of grid points and the geological constraints at the second subset of grid points, wherein a gradient of the depositional sequence volume is oriented orthogonally to reflection planes of the reflections; and
   displaying, on a user interface, the depositional sequence volume.

2. The method of claim 1, wherein identifying reflections at the first subset of the grid points further comprises:
   computing normal vectors of the plurality of reflections based on the image values at the first subset of grid points and deriving tangent vectors of the reflections at the first subset of grid points from the normal vectors of the reflections, wherein each grid point has an associated pair of linearly independent tangent vectors; and
   generating a depositional sequence volume for the 3-D subsurface model further comprises solving a set of partial differential equations that minimizes a sum of squares of a dot product between the gradient of the depositional sequence volume at a respective grid point and a pair of linearly independent tangent vectors at the grid point.

3. The method of claim 2, wherein the sum is minimized by subjecting the depositional sequence volume at the second subset of grid points to the corresponding geological constraints.

4. The method of claim 3, further comprising:
   identifying the grid points as either continuous horizon grid points or discontinuous grid points; and
   applying one or more predefined boundary conditions to the depositional sequence volume at a discontinuous grid point according to the geological constraints.

5. The method of claim 4, wherein the one or more predefined boundary conditions include that the depositional sequence volume satisfies Dirichlet boundary conditions at the first subset or the second subset of the grid points.

6. The method of claim 5, wherein the Dirichlet boundary conditions include prescribing predetermined values to a subset of the depositional sequence volume including the following locations: a) top and bottom slices of the depositional sequence volume and b) a collection of grid points with predetermined depositional sequence orders.

7. The method of claim 4, wherein the one or more predefined boundary conditions include that the depositional sequence volume satisfies Neumann boundary conditions at the discontinuous grid point.

8. The method of claim 4, wherein the one or more predefined boundary conditions include that the depositional sequence volume at two opposite sides of a fault plane satisfy a predefined depositional sequence order jump condition.

9. A computer system, comprising:
   a user interface;
   one or more processors;
   memory; and
   one or more programs, wherein the one or more programs are stored in the memory and configured to be executed by the one or more processors, the one or more programs including instructions that, when executed by the one or more processors, cause the computer system to:
   receive a seismic dataset comprising grid points of a 3-D subsurface model, wherein a first subset of grid points and a second subset of grid points identify corresponding 3-D seismic image cubes located within a 3-D cubical mesh and the first subset of grid points and the second subset of grid points comprise image values that describe the location and orientation of geological horizons located within the corresponding 3-D seismic image cubes;
   identify reflections at the first subset of the plurality of grid points and geological constraints at the second subset of the plurality of grid points by processing the image values;
   generate a depositional sequence volume for the 3-D subsurface model from the reflections at the first subset of grid points and the geological constraints at the second subset of grid points, wherein a gradient of the depositional sequence volume is oriented orthogonally to reflection planes of the reflections; and
   display the depositional sequence volume on the user interface.

10. The computer system of claim 9, wherein the instruction for identifying reflections at the first subset of the plurality of grid points further comprises instructions for: computing normal vectors of the reflections based on the image values at the first subset of grid points and deriving tangent vectors of the reflections at the first subset of grid points from the normal vectors of the reflections, wherein each grid point has an associated pair of linearly independent tangent vectors; and the instruction for generating a depositional sequence volume for the 3-D subsurface model further includes instructions for: solving a set of partial differential equations that minimizes a sum of squares of a dot product between the gradient of the depositional sequence volume at a respective grid point and a pair of linearly independent tangent vectors at the grid point.

11. The computer system of claim 10, wherein the sum is minimized by subjecting the depositional sequence volume at the second subset of grid points to the corresponding geological constraints.

12. The computer system of claim 11, wherein the one or more programs further include instructions for:
identifying grid points as either continuous horizon grid points or discontinuous grid points; and
applying one or more predefined boundary conditions to the depositional sequence volume at a discontinuous grid point according to the geological constraints.

13. The computer system of claim 12, wherein the one or more predefined boundary conditions include that the depositional sequence volume satisfies Dirichlet boundary conditions at the first subset or the second subset of the grid points.

14. The computer system of claim 13, wherein the Dirichlet boundary conditions include prescribing predetermined values to a subset of the depositional sequence volume including the following locations: a) top and bottom slices of the depositional sequence volume and b) a collection of grid points with predetermined depositional sequence orders.

15. The computer system of claim 12, wherein the one or more predefined boundary conditions include that the depositional sequence volume satisfies Neumann boundary conditions at the discontinuous grid point.

16. The computer system of claim 12, wherein the one or more predefined boundary conditions include that the depositional sequence volume at two opposite sides of a fault plane satisfy a predefined depositional sequence order jump condition.

17. A non-transitory computer readable storage medium storing one or more programs, the one or more programs comprising instructions, which when executed by a computer system having one or more processors and memory, cause the computer system to:
receive a seismic dataset comprising grid points of a 3-D subsurface model, wherein a first subset of grid points and a second subset of grid points identify corresponding 3-D seismic image cubes located within a 3-D cubical mesh and the first subset of grid points and the second subset of grid points comprise image values that describe the location and orientation of geological horizons located within the corresponding 3-D seismic image cubes;
identify reflections at the first subset of the grid points and geological constraints at the second subset of the grid points of the 3-D subsurface model from processing the image values of the seismic dataset;
generate a depositional sequence volume for the 3-D subsurface model from the reflections at the first subset of grid points and the geological constraints at the second subset of grid points, wherein a gradient of the depositional sequence volume is oriented orthogonally to reflection planes of the reflections; and
display the depositional sequence volume on a user interface.

18. The non-transitory computer readable storage medium of claim 17, wherein the instruction for identifying reflections at the first subset of the grid points further comprises instructions for: computing normal vectors of the reflections based on the image values at the first subset of grid points and deriving tangent vectors of the reflections at the first subset of grid points from the normal vectors of the plurality of reflections, wherein each grid point has an associated pair of linearly independent tangent vectors; and the instruction for generating a depositional sequence volume for the 3-D subsurface model further includes instructions for: solving a set of partial differential equations that minimizes a sum of squares of a dot product between the gradient of the depositional sequence volume at a respective grid point and a pair of linearly independent tangent vectors at the grid point.

19. The non-transitory computer readable storage medium of claim 18, wherein the sum is minimized by subjecting the depositional sequence volume at the second subset of grid points to the corresponding geological constraints.

20. The non-transitory computer readable storage medium of claim 19, wherein the one or more programs further include instructions for:
identifying grid points as either continuous horizon grid points or discontinuous grid points; and
applying one or more predefined boundary conditions to the depositional sequence volume at a discontinuous grid point according to the geological constraints.

21. The non-transitory computer readable storage medium of claim 20, wherein the one or more predefined boundary conditions include that the depositional sequence volume satisfies Dirichlet boundary conditions at the first subset or the second subset of the grid points.

22. The non-transitory computer readable storage medium of claim 21, wherein the Dirichlet boundary conditions include prescribing predetermined values to a subset of the depositional sequence volume including the following locations: a) top and bottom slices of the depositional sequence volume and b) a collection of grid points with predetermined depositional sequence orders.

23. The non-transitory computer readable storage medium of claim 20, wherein the one or more predefined boundary conditions include that the depositional sequence volume satisfies Neumann boundary conditions at the discontinuous grid point.

24. The non-transitory computer readable storage medium of claim 20, wherein the one or more predefined boundary conditions include that the depositional sequence volume at two opposite sides of a fault plane satisfy a predefined depositional sequence order jump condition.

* * * * *